United States Patent [19]
Chen

[11] Patent Number: 5,476,309
[45] Date of Patent: Dec. 19, 1995

[54] SAFETY HARNESS FOR A VEHICLE SEAT

[76] Inventor: K. C. Chen, No. 22, Lane 10, Sec. 4, Cheng Te Rd., Taipei, Taiwan

[21] Appl. No.: 348,874

[22] Filed: Nov. 29, 1994

[51] Int. Cl.⁶ ................................................ B60R 21/02
[52] U.S. Cl. ........................ 297/487; 248/160; 403/331
[58] Field of Search .................................. 297/487, 488, 297/256.15; 403/331; 248/160

[56] References Cited

U.S. PATENT DOCUMENTS 3,901,550  8/1975  Hamy ................................ 297/488 X
4,906,047  3/1990  Mikami ............................... 297/464
5,137,335  8/1992  Marten ............................ 297/488 X
5,286,091  2/1994  Busch .................................. 297/487

Primary Examiner—Peter R. Brown
Attorney, Agent, or Firm—Bacon & Thomas

[57] ABSTRACT

A safety harness consisting of a plurality of beveled rigid blocks connected in a string by loose couplings, having a fixed end fastened to one side of a vehicle seat by an adjustable mounting device and a free end fastened to an opposite side of the vehicle seat by a latch and latch release, wherein when the safety harness is fastened up, the rigid blocks are respectively side matched and connected into an arched rigid guard around the vehicle seat to protect the user.

3 Claims, 4 Drawing Sheets 5,476,309

SAFETY HARNESS FOR A VEHICLE SEAT

BACKGROUND OF THE INVENTION

The present invention relates to a safety harness for a vehicle seat which forms an arched-rigid guard around the vehicle seat to protect the user against the impact of objects when fastened up.

Motor vehicles are commonly equipped with safety belts for fastening the driver or passengers to the seat. However, the safety belt of a vehicle seat can only keep the user retained to the seat but cannot protect the user against the impact of objects. When an impact occurs, the driver or passenger may be injured by the impact of a front object such as the steering wheel or other parts of the motor vehicle. Furthermore, regular safety belts are not suitable for fastening to the vehicle seats which are not disposed far away from the sides of the body of the motor vehicle.

SUMMARY OF THE INVENTION

The present invention has been accomplished under the circumstances in view. It is one object of the present invention to provide a safety harness which forms into an arched, rigid guard around the vehicle seat to protect the user against objects when an impact occurs. It is another object of the present invention to provide a safety harness which can be loosely suspended from the vehicle seat at one side when it is not in use.

According to the present invention, the safety harness is comprised of a plurality of beveled rigid blocks connected in a string by loose couplings, having a fixed end fastened to one side of a vehicle seat by an adjustable mounting device and a free end fastened to an opposite side of the vehicle seat by a latch and latch release, wherein when the safety harness is fastened up, the rigid blocks are respectively side matched and connected into an arched rigid guard around the vehicle seat to protect the user.

DETAILED DESCRIPTION OF THE PREFERRED EMBODIMENT

Figure 1:
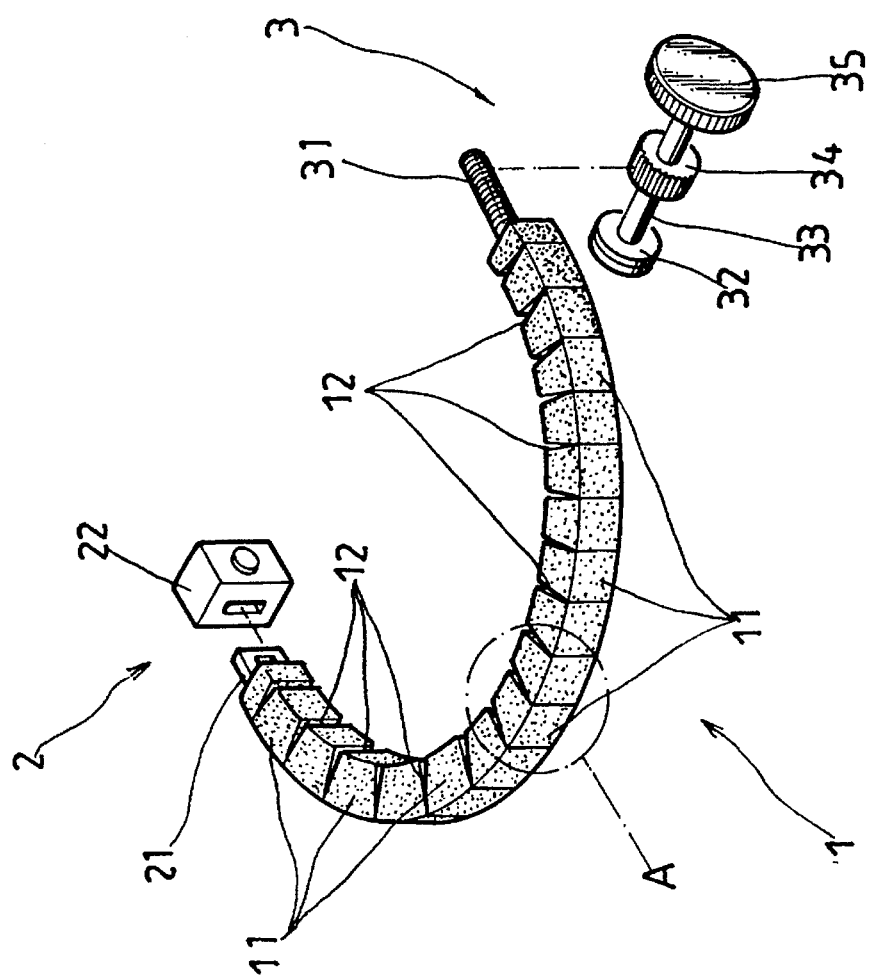
FIG. 1 is a perspective exploded view of a safety harness according to the present invention.
Figure 2:
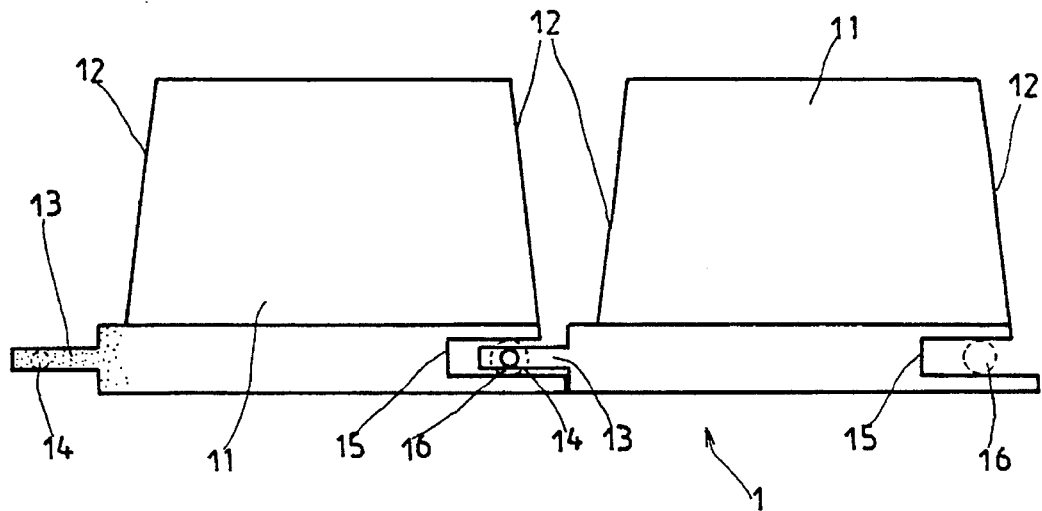
FIG. 2 is a longitudinal view in section in an enlarged scale of the part A of FIG. 1.
Figure 3:
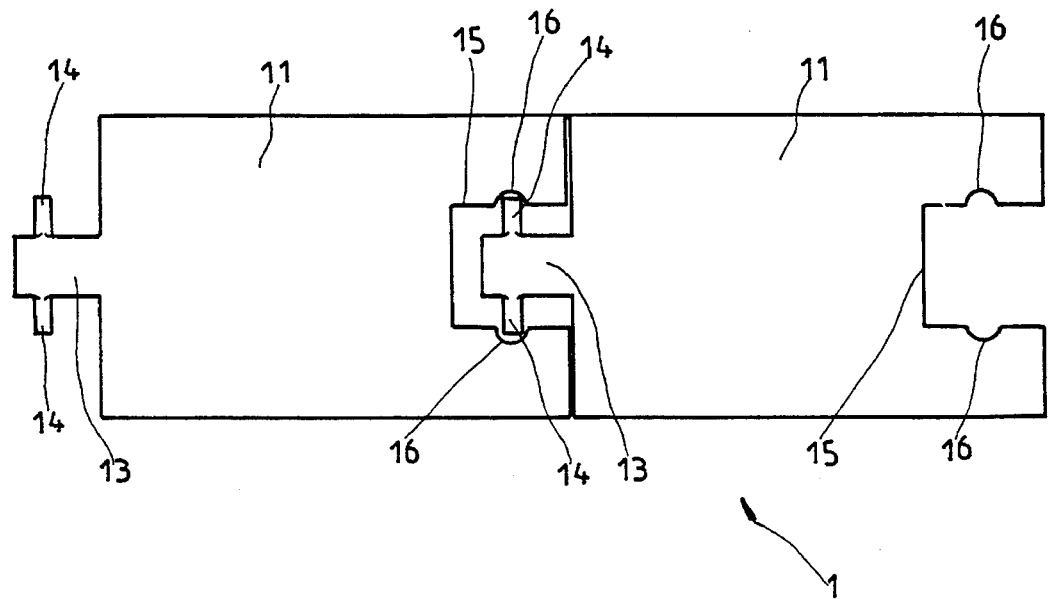
FIG. 3 is a transverse view in section in an enlarged scale of the part A of FIG. 1.

Referring to FIGS. 1, 2, and 3, a safety harness 1 in accordance with the present invention is generally comprised of a plurality of rigid blocks 11 connected in a string. The rigid blocks 11 have each two opposite bevel lateral sides 12 such that when the bevel lateral sides 12 of the rigid blocks 11 are respectively side matched, the rigid blocks 11 are connected into an arched configuration. Each rigid block 11 comprises an outward extension plate 13 extended from the bottom at one side, a side chamber 15 disposed near the bottom at an opposite side, two recessed holes 16 bilaterally disposed inside the side chamber 15. The outward extension plate 13 has two pins 14 perpendicularly raised from two opposite sides thereof. When the rigid blocks 11 are linked, the extension plate 13 of one rigid block 11 is inserted into the side chamber 15 of another, and the pins 14 of each extension plate 13 are respectively inserted into the recessed holes 16 in the corresponding side chamber 15 to form a loose coupling. When the respective pins 14 are respectively inserted into the respective recessed holes 16, the rigid blocks 14 are prohibited from being moved apart from one another in the longitudinal direction. When the safety harness 1 is bent inwards to let the bevel lateral sides 12 of the rigid blocks 11 be closely attached one another, the rigid blocks 14 are connected and arranged into the arched configuration as shown in FIG. 1. When rigid blocks 11 of the safety harness 1 are released from the bevel lateral sides 12 of the rigid block 11 become spaced from one another. However, because pins 14 are fastened to the recessed holes 16, the rigid blocks 11 do not disconnect from one another when the safety harness 1 is released.

The safety harness 1 comprises a fastener 2 at one end (the free end), and an adjustable mounting device 3 at an opposite end (the fixed end). The fastener 2 is comprised of a latch 21 fixedly fastened to free end of the harness 2, and a latch release 22 fixedly fastened to one side of the vehicle seat 5 (see also FIG. 6). The adjustable mounting device 3 comprises a screw rod 31 fixedly fastened to the fixed end of the safety harness 1, an axle block 32 fixedly fastened to one side of the vehicle seat 5 opposite to the latch release 22, a gear shaft 33 turnably supported on the axle block 32, a knob 35 fixedly mounted on the gear shaft 33 at one end opposite to the axle block 32, and a gear 34 fixedly mounted around the gear shaft 33 between the knob 35 and the gear block 32 and meshed with the screw rod 31. By turning the gear 34 through the knob 35 to move the screw rod 31 inwards or outwards, the operative length of the safety harness 1 is adjusted.

Figure 4:
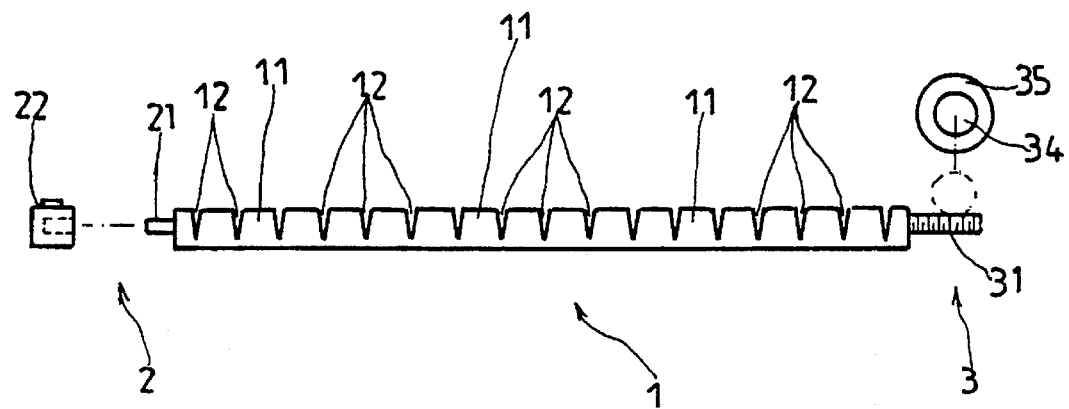
FIG. 4 is a schematic drawing showing the safety harness extended out when suspended.
Figure 5:
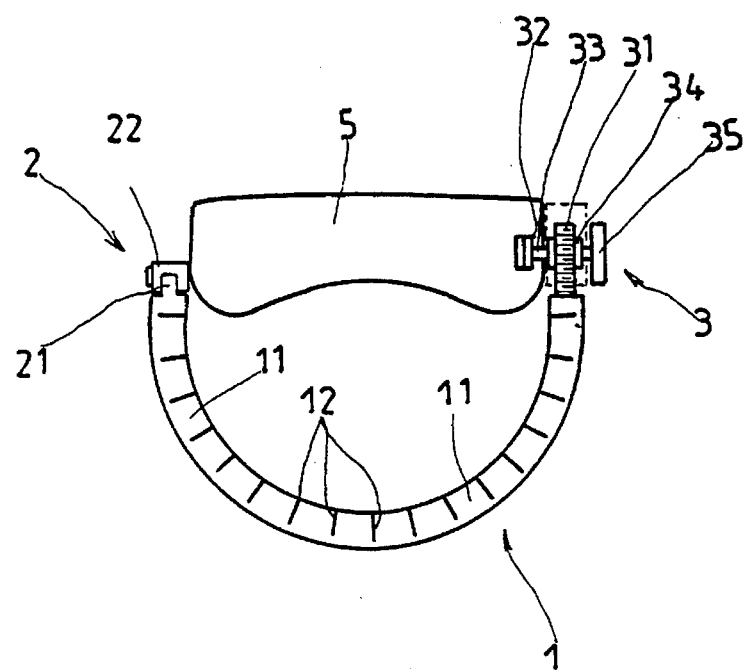
FIG. 5 is a schematic drawing showing the safety harness installed in a vehicle seat and fastened up.
Figure 6:
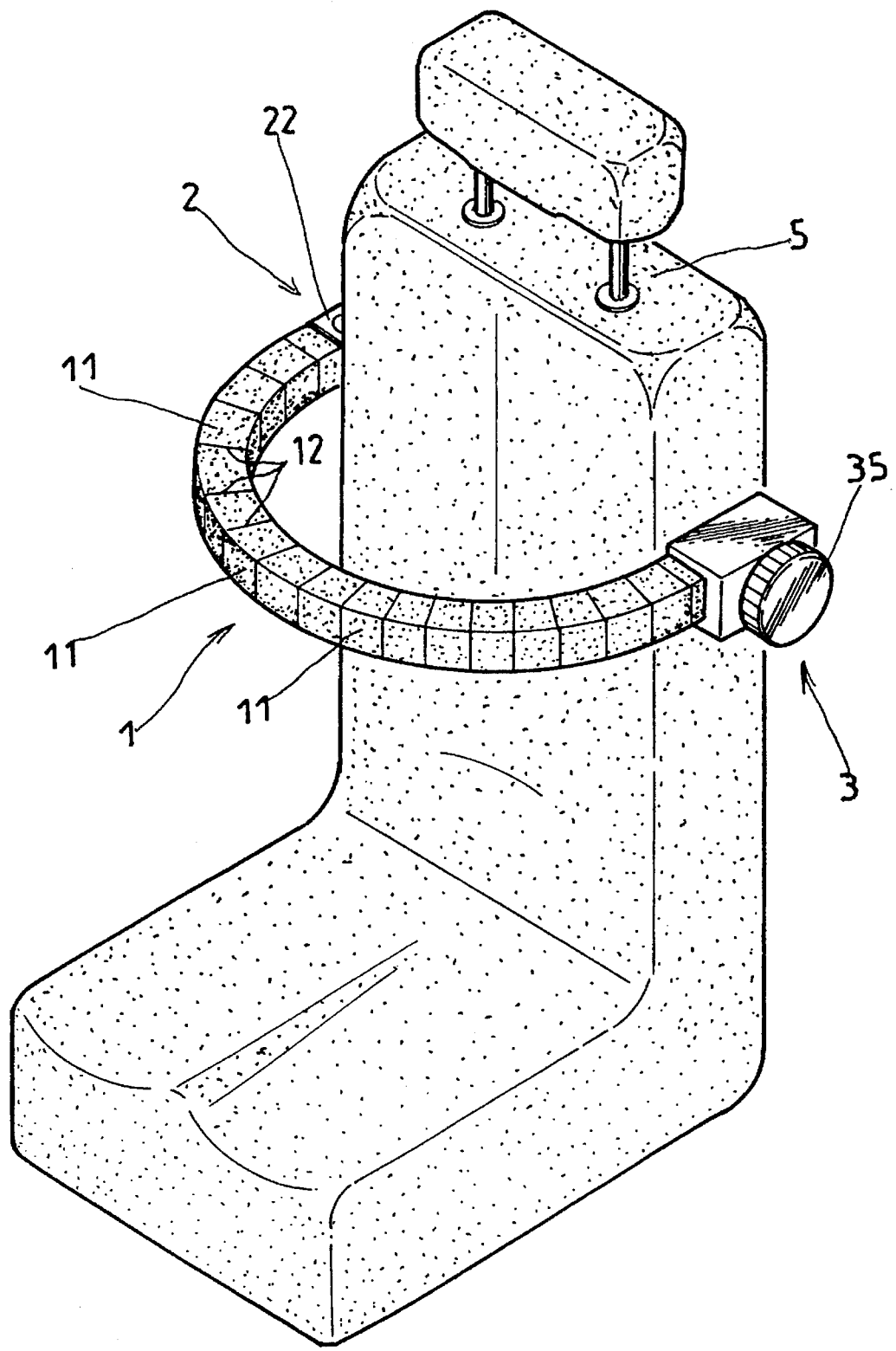
FIG. 6 is an elevational view showing the safety harness installed in a vehicle seat.

Referring to FIGS. 4, 5, and 6, the two opposite ends of the safety harness 1 are fastened to two opposite sides of the vehicle seat 5 by the fastener 2 and the adjustable mounting device 3. When not in use, the latch 21 is released from the latch release 22, and therefore the safety harness 1 is suspended from the adjustable mounting device 3 (one side of the vehicle seat 5). When the user sits on the vehicle seat 5, the safety harness 1 is fastened around the user's body by connecting the latch 21 to the latch release 22. When the safety harness 1 is fastened up, the user can then adjust the length of the safety harness 1 to fit around the user's body by turning the knob 35. When adjusted, the safety harness 1 forms an arched, rigid guard to protect the user.

The safety harness 1 can be fastened to a vehicle seat at any elevation to protect the chest, the head, or the legs against the impact of a front object.

While only one embodiment of the present invention has been shown and described, it will be understood that various modifications and changes could be made without departing from the spirit and scope of the invention.

What is claimed is:

1. A safety harness for a vehicle seat, comprised of a plurality of rigid blocks connected in a string, said rigid blocks each comprising two opposite bevel lateral sides, a side chamber at one bevel lateral side, two opposite recessed holes inside said side chamber, and an extension plate at an opposite bevel lateral side, said extension plate having two opposite pins, said rigid blocks being linked by inserting the pins of the extension plate of one rigid block into the recessed holes of the side chamber of another, wherein when the safety harness is fastened up, the bevel lateral sides of said rigid blocks are respectively side matched, and said rigid blocks for connected into an arched rigid guard around the vehicle seat to protect the user.

2. The safety harness of claim 1 having a first end for fixing to one side of the vehicle seat and a second end for detachably connecting to an opposite side of a vehicle seat by a latch and latch release.

3. The safety harness of claim 2 wherein said first end includes an adjustable mounting device for fastening to a vehicle seat, said adjustable mounting device comprising a screw rod 31 fixedly fastened to said first end, an axle block for fixedly fastening to a vehicle seat opposite to said latch release, a gear shaft turnably supported on said axle block, a knob fixedly mounted on said gear shaft at one end opposite to said axle block, and a gear fixedly mounted around said gear shaft between said knob and said gear block and meshed with said screw rod.

* * * * *